United States Patent [19]
Thompson, III

[11] 3,887,263
[45] June 3, 1975

[54] HIGH RESOLUTION WIDE FIELD SCAN SYSTEM

[75] Inventor: William S. Thompson, III, McKinney, Tex.

[73] Assignee: Texas Instruments Incorporated, Dallas, Tex.

[22] Filed: Sept. 7, 1967

[21] Appl. No.: 666,215

[52] U.S. Cl. .................... 350/7; 350/294; 350/285; 250/203 R
[51] Int. Cl. ............................................ G02b 17/00
[58] Field of Search ...................... 350/7, 285, 294; 250/203 R

[56] References Cited
UNITED STATES PATENTS
3,244,885  4/1966  McHenry ............................ 350/294
3,330,958  7/1967  Kaisler et al. ................... 250/203 R Primary Examiner—Maynard R. Wilbur
Assistant Examiner—S. C. Buczinski
Attorney, Agent, or Firm—Harold Levine; Rene' E. Grossman; Alva H. Bandy

[57] ABSTRACT

A high resolution scanning system is disclosed composed of a spherical collecting mirror and a rotating aspheric element scanning the image plane of the spherical mirror, the axis of rotation of the aspheric element passing through the center of curvature of the spherical mirror, and the entrance pupil to the scanning system being located at the center of curvature of the spherical mirror. By rotating the aspheric element, a high resolution wide field scan system is obtained. With this scan system, spherical aberration is eliminated and coma and astigmatism are maintained constant over the entire field of scan.

16 Claims, 5 Drawing Figures

WILLIAM S. THOMPSON III
INVENTOR

BY René E. Grossman
ATTORNEY

HIGH RESOLUTION WIDE FIELD SCAN SYSTEM

This invention pertains to optical scanning systems and more particularly to a high resolution wide field optical scanning system.

There are two constraints which limit the performance of optical scanning systems. They are resolution and field of view. All scanning systems in the prior art have had to sacrifice one of these constraints to optimize the other. In other words, to achieve high resolution a narrow field of view must be accepted while to achieve a wide field of view, resolution will be degraded. A great need exists, in the field of infrared (IR) reconnaissance systems, for example, for a high resolution wide field of view scanning system.

Accordingly, it is an object of this invention to provide a high resolution wide field of view optical scanning system.

Another object of the invention is to provide an optical scanning system in which the problems of spherical aberration, coma and astigmatism are either eliminated or minimized. These and other objects and features will be apparent from the following specification when read in conjunction with the appended claims and attached drawings in which:

Figure 1:
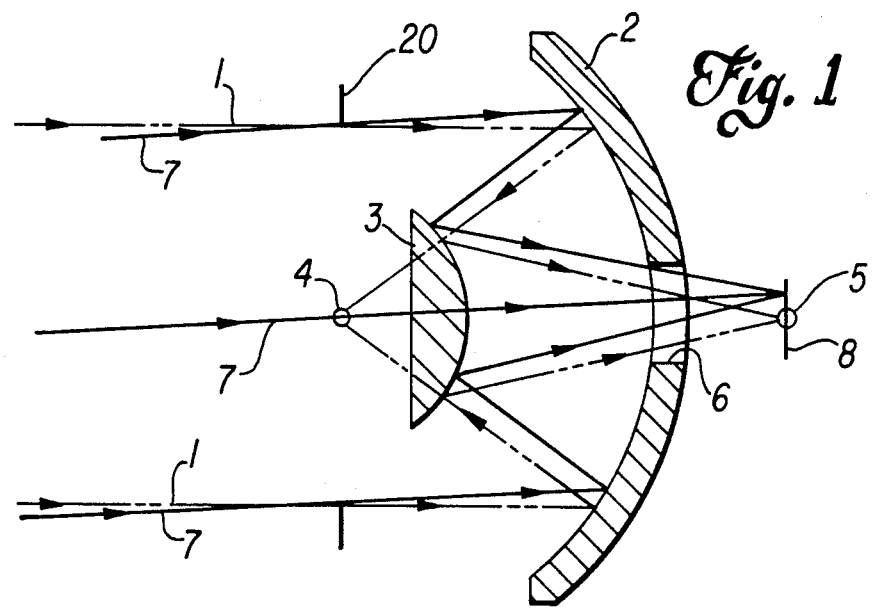
FIG. 1 illustrates an optical system comprising a spherical primary mirror and a stationary aspheric secondary mirror.

In essence, the invention comprises a spherical primary mirror for collecting optical energy, and one or more rotating aspheric secondary mirrors spaced equal distances apart, about the arc of rotation, scanning the image plane of the primary mirror. The axis of rotation of each of the secondary aspheric mirrors passes through the center of curvature of the spherical primary mirror and the entrance pupil of the optical system. Thus a wide field high resolution optical scanning system is effected in which sperical aberration is eliminated and coma and astigmatism are maintained constant throughout the field of view of the system.

If a spherical mirror with a large angular aperture is used to collect parallel light rays, image formation of an on-axis image point is imperfect because all of the reflected rays do not pass through a single point. This effect is called spherical aberration and can be eliminated by a Cassegrain type arrangement such as that shown in FIG. 1. In that arrangement, the parallel rays of light 1 are reflected by a spherical primary mirror 2, having an aperture or hole 6 in the center thereof. An aspheric mirror 3 is introduced into the path of the reflected rays between the primary mirror 2 and the focal point 4 thereof and having its reflective surface facing the reflecting surface of the primary mirror. The aspheric mirror causes the rays reflected from the primary mirror which impinge upon the aspheric mirror to be reflected to a point 5, by passing through the aperture 6 in the primary mirror 2, with the result of no spherical aberration being present. This occurs because the aspheric mirror 3 departs from a spherical form by a slight amount at the edges; this amount of deviation is sufficient to cause the rays reflected from the extremities of primary mirror 2 to be reflected to the same point 5 as those rays reflected from the inner points on primary mirror 2. A detector or group of detectors 8 is placed at point 5 for detecting the information contained in the reflected beams.

With the optical system illustrated in FIG. 1 spherical aberration is eliminated and a high resolution image is present at detector 8. However, in order to achieve this high resolution, the field of view of the system is quite narrow.

Figure 4:
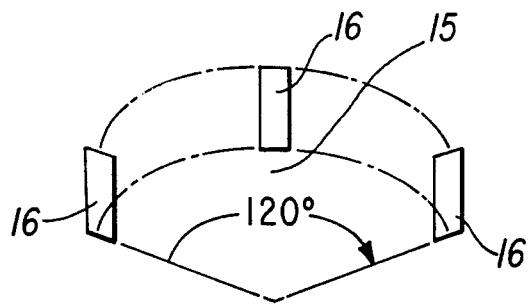
FIG. 4 illustrates the field of view of the optical system of FIGS. 2 and 3.
Figure 2:
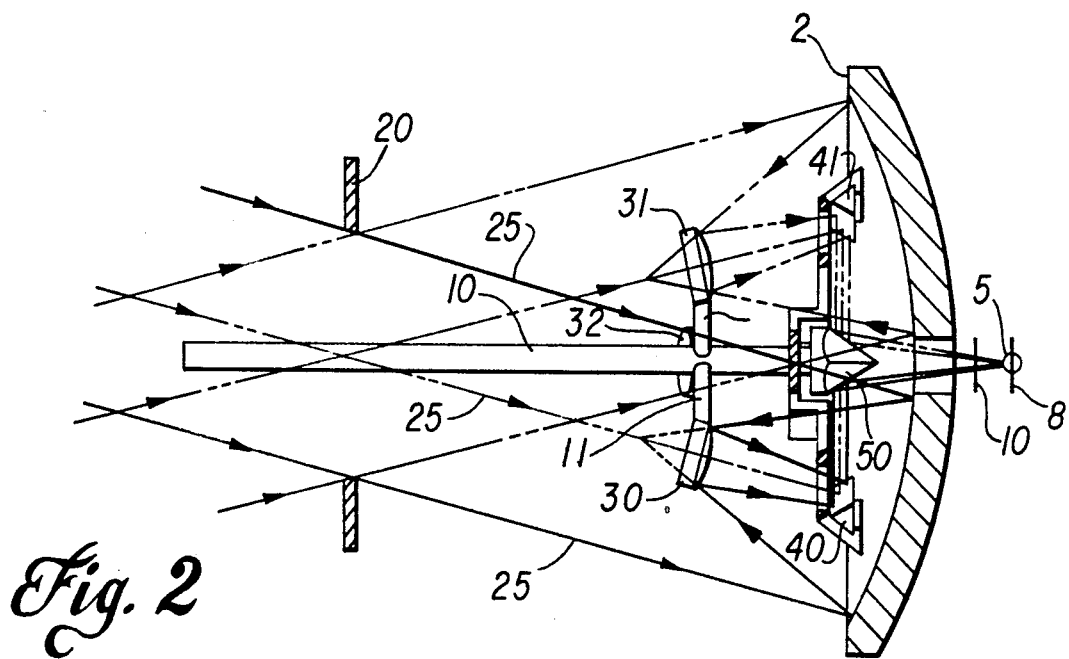
FIG. 2 illustrates a similar optical system with a spherical primary mirror and a rotating aspheric secondary mirror, along with appropriate folding mirrors for directing the light beams along a desired path.
Figure 3:
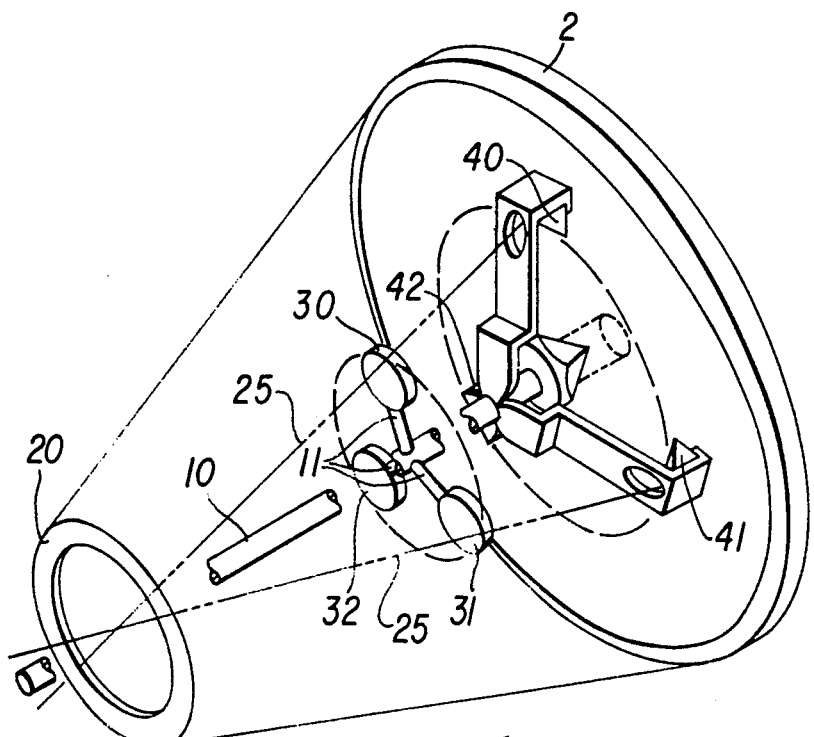
FIG. 3 illustrates the optical system of FIG. 2 in perspective.

An optical scanning system for providing the high resolution obtainable with the system of FIG. 1 and in addition providing a wide field of view is illustrated in FIGS. 2 and 3. The primary mirror 2 of the system illustrated in FIGS. 2 and 3 is identical to the primary mirror of the system of FIG. 1. One or more aspheric secondary mirrors, such as element 30, and performing much the same function as the aspheric mirror 3 in FIG. 1, are attached to a rotating shaft 10 by arms 11 extending from the shaft 10 to the mirror. Where there are more than one such mirror, the mirrors are equally spaced around shaft 10. In the preferred embodiment illustrated in FIGS. 2 and 3, three such asperhic mirrors are shown, namely, 30, 31 and 32. Each such aspheric mirror produces a small field of view with a high degree of resolution. By rotating the aspheric mirror, the system can scan a wide field of view with the same high degree of resolution available for the narrow field of view obtained with the stationary system. A typical scan angle for the system of three aspheric mirrors is illustrated in FIG. 4. As can be seen from the illustration, a scan angle of 120° is achieved. A shutter, described hereinafter, is placed in the system such that detector 8 (placed at point 5 similar to the placement shown in FIG. 1) receives energy from one aspheric mirror at a time. FIG. 4 also illustrates how a system with a wide field of view 15 can be obtained by rotating an aspheric mirror of narrow field 16. In that Figure the element 16 represents the instantaneous field of view of the scanning system. By rotating the aspheric mirrors, a continuous scan will be effected comprised, in essence, of a continuum of such resolution elements 16 such that after a 120° rotation of the shaft 10 and the aspheric mirrors attached thereto, the wide field of view 15 in FIG. 4 will have been completely scanned.

In order that the aspheric mirrors maintain a constant relationship with the primary mirror 2, the cone of rotation of each of the aspheric mirrors has its apex at the center of curvature of primary mirror 2. By cone of rotation is meant the cone generated by the optical axis of the aspheric mirror as the mirror is rotated about the shaft 10.

Figure 5:
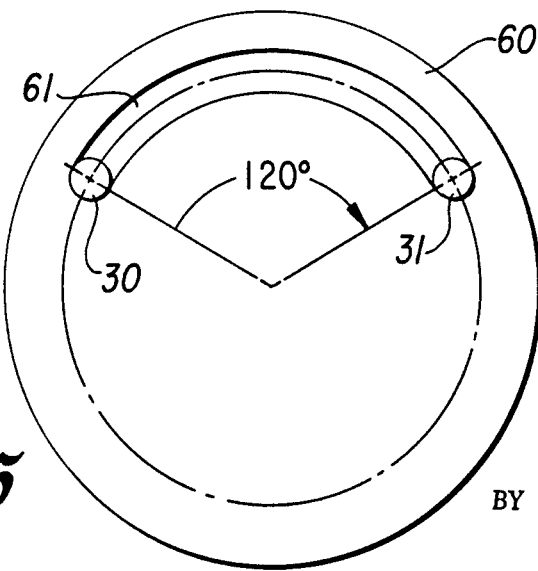
FIG. 5 illustrates a shutter which is placed within the scanning system illustrated in FIGS. 2 and 3.

A shutter, mentioned previously, and illustrated in FIG. 5 limits the scan angle of the scanning system, this scan angle for the preferred embodiment being 120°. This shutter is shown generally by the reference indicator 60 and is placed in the scanning system between the primary mirror and detector 8 as shown in FIG. 2 by the reference designator 60. In FIG. 5, the shutter 60 consists of an opaque plate or the like with a 120° cutout 61 along and on either side of an arc thereof. Aspheric mirrors 30 and 31 are shown at either extreme end of the cutout 61. Thus, energy reaches the detector 8 only during the 120° of rotation of the scanning mirrors.

Only one aspheric mirror such as mirror 30, is needed to perform a 120° scan; however, there would be a considerable dead time between the time that the mirror 30 completes one scan and begins another. Consequently, mirrors 31 and 32 are added to improve the scan duty cycle. That is, as soon as mirror 30 completes its scan, mirror 32 will have moved into place to begin the next scan, and as soon as mirror 32 completes its scan, mirror 31 will have moved into position to begin its scan, thus effecting a nearly 100% duty cycle.

Since the aspheric mirrors 30, 31 and 32 were not located on the optical axis of the primary mirror 2, as is aspheric mirror 3 of FIG. 1, the reflected light from the mirrors will not pass through the aperture in the center of the primary mirror 2 without some modification of the direction of the rays from these aspheric mirrors. Therefore, folding mirrors 40, 41 and 42 are mounted so as to also rotate about the axis 10 and be aligned with aspheric mirrors 30, 31 and 32, respectively, to bend the rays therefrom toward a pyramidal mirror 50 which also rotates with shaft 10 and directs the rays from the folding mirrors through the aperture in the primary mirror 2 towards the aforementioned detector 8 located at point 5. A principal ray 25 is shown in FIG. 2 to illustrate the previously described ray path, that is, the ray enters the scanning system through the entrance pupil 20, is reflected by the primary mirror 2 to aspheric secondary mirror 31, is reflected from there to folding mirror 41 to pyramidal mirror 50 and through aperture 6 and shutter 60 to detector 8 located at point 5.

In order that the distance from the entrance pupil of the optical system to the primary mirror 2 be constant for any angular inclination of an entering light ray, the entrance pupil 20 is placed orthogonal to the optical axis of the primary mirror and at the center of curvature thereof. Because of this location of the entrance pupil and the fact that the cone of rotation of each of the aspheric mirrors is at the center of curvature of primary mirror 2, any entering ray bundle will see a constant relationship between the primary mirror 2 and any one of the aspheric secondary mirrors and thus coma and astigmatism will be constant for any position of the aspheric secondary mirrors.

It is to be understood that the form of my invention herewith shown and described is to be taken as a preferred example of the same and the various changes in the size and shape and arrangement of parts may be resorted to without departing from the spirit and the scope of the invention as defined by the appended claims.

What is claimed is:
1. An optical system comprising:
   a. a spherical primary mirror having an aperture therein,
   b. an aspheric secondary mirror disposed to intercept rays from said primary mirror, and
   c. means for rotating said aspheric secondary mirror about the optical axis of said primary mirror,
   d. an entrance pupil located at the center of curvature of said primary mirror, whereby rays entering the system through said pupil are reflected by said primary mirror to said aspheric secondary mirror and thence through said aperture to focus at a point behind said primary mirror.

2. The system of claim 1 wherein said aperture is placed at the center of said primary mirror.

3. An optical system comprising:
   a. a spherical primary mirror having an aperture therein,
   b. an entrance pupil located at the center of curvature of said primary mirror,
   c. a rotatable shaft located within the system between said primary mirror and said entrance pupil, the axis of which extends through the center of said aperture in said primary mirror and the center of said entrance pupil,
   d. at least one arm extending radially from said shaft,
   e. at least one aspheric secondary mirror attached to said at least one arm and disposed so as to intercept rays from said primary mirror, and
   f. means for directing rays, intercepted by said aspheric mirror and reflected thereby, through said aperture in said primary mirror, whereby rays entering the system through said pupil are reflected by said primary mirror to said at least one aspheric mirror and thence via said means for directing through said aperture to focus at a point behind said primary mirror and whereby upon rotating said shaft, said system effects a wide field of view.

4. The system of claim 3 wherein said aperture is placed at the center of said primary mirror.

5. The system of claim 3 wherein said means for directing rays comprises:
   a. an arm extending radially from said shaft,
   b. a first plane mirror affixed to the outer end of said arm and so disposed relative to said aspheric mirror to receive rays reflected therefrom,
   c. a second plane mirror attached to said shaft and disposed relative to said first plane mirror so as to receive rays reflected from said first plane mirror and redirect said rays through said aperture.

6. The system of claim 3 including a shutter mounted within said system to limit the 360° scan of the system to a scanned arc of less than 360°.

7. The system of claim 6 wherein said shutter limits said scanned arc to 120°.

8. The system of claim 6 wherein said shutter is mounted between the back of said primary mirror and the position of an information sensor located external to said system.

9. An optical system comprising:
   a. a spherical primary mirror having an aperture therein,
   b. an entrance pupil located at the center of curvature of said primary mirror,
   c. a rotatable shaft located within the system between said primary mirror and said entrance pupil, the axis of which extends through the center of said aperture in said primary mirror and the center of said entrance pupil,
   d. a plurality of arms extending radially from said shaft,
   e. a plurality of aspheric secondary mirrors, each attached to one of said plurality of arms and disposed so as to intercept rays from said primary mirror, and
   f. means for directing rays, intercepted by said aspheric mirrors and reflected thereby, through said aperture in said primary mirror; whereby rays entering the system through said pupil are reflected by said primary mirror to one of said aspheric mirrors and thence via said means for directing through said aperture to a focus at a point behind said primary mirror whereby upon rotation of said shaft, a wide field of view is effected.

10. The system of claim 9 wherein said aperture is placed at the center of said primary mirror.

11. The system of claim 9 wherein said means for directing rays comprises:
   a. a plurality of arms extending radially from said shaft, said plurality being equal in number to said plurality of aspheric mirrors,
   b. a plurality of plane mirrors, each connected to the outer end of said plurality of arms and so disposed relative to said aspheric mirrors to receive rays reflected therefrom,
   c. a multi-faceted mirror aligned with and attached to said shaft, said multiple faces being equal in number to said plurality of plane mirrors and disposed relative to said plane mirrors so as to receive rays reflected therefrom and to redirect and focus the light behind said aperture.

12. The system of claim 9 including a shutter mounted within said system to limit the 360° scan of the system to a scanned arc of less than 360°.

13. The system of claim 12 wherein said scanned arc is limited to 120° by said shutter and said aspheric mirrors are on 120° centers around said shaft.

14. The system of claim 12 wherein said shutter is located between the back of said primary mirror and the position of an information sensor located external to said system.

15. The system of claim 9 wherein said plurality of arms and said plurality of aspheric mirrors attached thereto are equally spaced around said shaft.

16. The system of claim 15 wherein there are three arms and aspheric mirrors attached thereto on 120° centers around said shaft.

* * * * *